June 28, 1932.    R. D. TOUTON    1,865,154
METHOD FOR CONDITIONING TOBACCO
Filed June 6, 1931
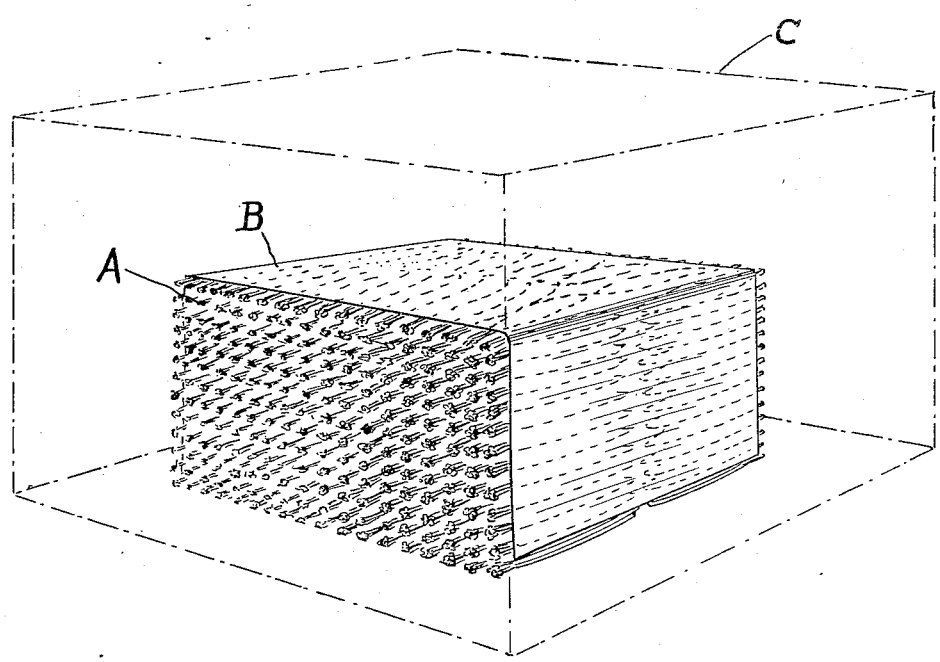
WITNESS:
INVENTOR
Rush D. Touton
BY
ATTORNEYS.

Patented June 28, 1932

1,865,154

UNITED STATES PATENT OFFICE

RUSH DONWELL TOUTON, OF PHILADELPHIA, PENNSYLVANIA, ASSIGNOR TO BAYUK CIGARS INCORPORATED, OF PHILADELPHIA, PENNSYLVANIA, A CORPORATION OF MARYLAND

METHOD FOR CONDITIONING TOBACCO

Application filed June 6, 1931. Serial No. 542,639.

My invention relates to an improvement in method for conditioning tobacco and, more particularly, relates to an improved method for effecting the uniform moistening of tobacco to render it workable for the manufacture of cigars and to bring out its flavor.

As is well known, tobacco is usually arranged for storage and shipment in the form of so-called hands comprising a number of tobacco leaves laid together and secured by a tie or wrapping about their butt ends. The hands are in turn packed under pressure in cases or bales and the tobacco leaves forming the hands become tightly pressed together and to a degree adhered to one another, so that they cannot be separated without injury, due to the brittleness of the leaf and stem portions when the tobacco is dry as it is when received by the manufacturer of cigars.

In order to enable separation of the leaves forming the hands of tobacco and to render the tobacco workable and bring out its flavor, it must be conditioned by the application of moisture and such has heretofore presented various difficulties, chiefly in that while the exterior leaves of the hands may be readily moistened, the interior leaves are not accessible to moisture without manipulation, and in that the different capacity for and rate of absorption of moisture by the butt portions of the leaves inhibits separation of the leaves without injury and promotes nonuniform moistening of the hands as a whole.

Now, in accordance with my invention, I provide a method for conditioning or moistening tobacco in hands in such a manner as to greatly facilitate the moistening of the interior leaves of the hands and to insure uniform moistening of the hands as a whole.

The method in accordance with my invention involves essentially treatment of the tobacco in hands and involves two steps comprising first, subjecting the butt ends of the leaves forming the hands to moisture and second, subjecting the leaves to moisture.

In carrying the method into practice the butts of the hands may be moistened in any desired manner, as by wetting them with water or by subjecting them to a moist or humid atmosphere, while protecting the leaves from moisture, in any suitable manner, during the moistening of the butts. During the application of moisture to the butts, the stem branches in the leaves will become moistened since moisture absorbed through the butts will travel out into the stem branches.

After the butts have absorbed a desired or sufficient amount of moisture the leaves are moistened in any suitable manner, as by subjecting them, or the hands as a whole, to a moist or humid atmosphere.

The pre-moisting of the butts of the hands will have the effect that the butts, which do not absorb moisture as rapidly as do the leaves, will not interfere with or inhibit separation of the leaves from the exterior to the interior of the hands as they are moistened, and the fact that the stem portions of the leaves which absorb moisture more slowly than do the body portions have absorbed moisture, which softens them and renders them pliable, the original adherence of the leaves, interior and exterior, will be partially broken and the stem portions will not resist separation and consequent admission of moisture to the interior of the hands.

As more specifically illustrative of a practical adaptation of my invention, I will describe a preferred procedure with reference to the accompanying drawing in which the figure is a perspective view of a plurality of hands of tobacco under treatment for moistening of the butts.

In the drawing A indicates a plurality of hands of tobacco stacked one upon the other and extending in opposite directions, all as is clearly illustrated. B indicates a covering extending over the leaf portions of the hands. The covering may be of any suitable material which will protect the leaves from moisture, as oil cloth, rubberized fabric, etc., or may comprise merely a board laid on the top of the stack of hands.

The stack of hands A, the leaf portions of which are covered by the covering B, are subjected to a moist or humid atmosphere, which, for example, may be provided in a room or chamber in which the stack is formed, as indicated by the outline C, or moist air may be projected at the butts or they may be wet with water. In any event the covering B protects the leaves from moisture.

The butts may be moistened in an atmosphere at a temperature of about 55° F. to 90° F. and maintained substantially saturated with moisture.

When the butts have been sufficiently moistened, which may be determined by their having attained a substantial pliability, the leaves are moistened in any desired manner, as for example, by merely removing the covering and spreading the hands out in the same humid atmosphere used to moisten the butts, or in any other well known manner.

It would be understood that the described arrangement of the hands of tobacco for proceeding in accordance with my invention is illustrative only and may be varied as desired or convenient without departing from my invention, which broadly involves first moistening the butts of hands of tobacco while avoiding moistening of the leaves and then moistening the leaves.

Having now fully described my invention, what I claim and desire to protect by Letters Patent is:

1. The method for conditioning tobacco which includes moistening the butts of hands of tobacco to render them substantially pliable, while avoiding any substantial moistening of the tobacco leaves and then moistening the leaves.

2. The method for conditioning tobacco which includes subjecting the butts of hands of tobacco to a moist atmosphere while protecting the tobacco leaves therefrom and, then, after the butts of the leaves have attained substantial pliability subjecting the leaves to a moist atmosphere.

3. The method for conditioning tobacco which includes arranging hands of tobacco in a stack covering the leaf portions of the hands and leaving the butts exposed, providing a humid atmosphere about the stack and after the butts of the leaves have obtained a substantial pliability uncovering the leaf portions, breaking up the stack and subjecting the hands to a moist atmosphere.

In testimony of which invention, I have hereunto set my hand, at Philadelphia, Pa., on this 4th day of June, 1931.

RUSH DONWELL TOUTON.